United States Patent
Miyachi et al.

(10) Patent No.: US 7,328,617 B2
(45) Date of Patent: Feb. 12, 2008

(54) AIR LEVITATION APPARATUS WITH NEUTRALIZATION DEVICE, AND NEUTRALIZATION METHOD FOR LEVITATION APPARATUS

(75) Inventors: Hiroshi Miyachi, Tsukuba-gun (JP); Takeshi Nishikawa, Tsukuba-gun (JP); Satoshi Suzuki, Tsukuba-gun (JP)

(73) Assignee: SMC Corporation, Tokyo (JP)

( * ) Notice: Subject to any disclaimer, the term of this patent is extended or adjusted under 35 U.S.C. 154(b) by 35 days.

(21) Appl. No.: 11/304,756

(22) Filed: Dec. 16, 2005

(65) Prior Publication Data

US 2006/0165496 A1  Jul. 27, 2006

(30) Foreign Application Priority Data

Dec. 22, 2004  (JP) .............................. 2004-371846

(51) Int. Cl.
 *G01H 17/00* (2006.01)
(52) U.S. Cl. ........................... 73/570.7; 406/88; 406/89
(58) Field of Classification Search .................. 406/88, 406/89; 414/676; 73/570.5
 See application file for complete search history.

(56) References Cited

U.S. PATENT DOCUMENTS

| | | | |
|---|---|---|---|
| 3,976,330 A * | 8/1976 | Babinski et al. ............... 406/84 |
| T966,009 I4 * | 1/1978 | Gardineer et al. ............ 406/89 |
| 4,622,918 A * | 11/1986 | Bok ............................ 118/718 |
| 4,738,748 A * | 4/1988 | Kisa ............................ 438/727 |
| 5,788,425 A * | 8/1998 | Skow et al. ................... 406/88 |
| 6,315,501 B1 * | 11/2001 | Yagai et al. ................. 406/198 |
| 6,336,775 B1 * | 1/2002 | Morita et al. .................. 406/88 |
| 6,354,789 B2 * | 3/2002 | Takeuchi et al. ............. 414/676 |

FOREIGN PATENT DOCUMENTS

| | | |
|---|---|---|
| DE | CHX 620 056 A5 | 12/1978 |
| DE | 10 2004 057 904 A1 | 6/2005 |
| JP | 2000062953 A | 2/2000 |

\* cited by examiner

*Primary Examiner*—Joe Dillon, Jr.
(74) *Attorney, Agent, or Firm*—Oblon, Spivak, McClelland, Maier & Neustadt, P.C.

(57) ABSTRACT

To reduce installation space for neutralization devices of neutralization of static electricity generated by work levitation air in an air levitation apparatus which levitates plate-shaped work by jettisoning of air. With an apparatus wherein multiple air jets are provided on a work levitation face for levitation of plate-shaped work, so as to levitate the work by jettisoning of air, an ionization device for ionizing the air is installed in the supply channel of the work levitation air, thereby neutralizing the static electricity generated by the work levitation air that is jettisoned.

5 Claims, 2 Drawing Sheets

AIR LEVITATION APPARATUS WITH NEUTRALIZATION DEVICE, AND NEUTRALIZATION METHOD FOR LEVITATION APPARATUS

TECHNICAL FIELD

The present invention relates to an air levitation apparatus for levitation of work by jettisoning of air, which has been provided with a neutralization device, and a neutralization method for the levitation apparatus.

PRIOR ART

Air levitation apparatuses which have air jets on a face above which a work is to be levitated, so as to levitate the work by the jettisoning of air from the jets, or to transport the work while levitating the work, are conventionally known. With such apparatuses, static electricity is generated at the work due to the friction from the blowing air, so an electrostatic removal device is often provided.

For example, with the conventional air levitation apparatus 51 shown in FIG. 5 for transporting a plate-shaped work 56 by levitation of the work 56, static electricity is generated at the work 56 due to the friction from the air jettisoned from the multiple jets 53 provided on a work levitation face 52 flowing between the work 56 and the work levitation face 52, so neutralization devices 54 for removing the static electricity are disposed above and below the work 56 along the transportation path of the work 56, and ionized neutralization air 55 is blown onto the upper face and the lower race of the work 56 from the neutralization devices 54, thereby neutralizing the work 56.

However, with a corona discharge neutralization device 54 which performs neutralization by blowing neutralization air 55 on the upper face and the lower face of the work 56, a certain distance between the work 56 and the neutralization device 54 is necessary since placing the work 56 and the neutralization devices 54 too close together increases the risk of poor ion balance, and a certain neutralization device installation space H has been necessary within the air levitation device even though transporting the thin plate shaped work 56.

DISCLOSURE OF THE INVENTION

A technical object of the present invention is to provide an air levitation apparatus with a neutralization device and a neutralization method thereof, wherein the installation space above and below the transporting path for the neutralization devices can be reduced with regard to neutralization of static electricity on work generated by work levitation air.

Another technical object of the present invention is to provide an air levitation apparatus with a neutralization device and a neutralization method thereof, wherein a plate-shaped work can be neutralized without irregularities.

An air levitation apparatus with a neutralization device according to the present invention for solving the above problems is an apparatus having a neutralization device, wherein multiple air jets are provided on a work levitation face upon which a plate-shaped work is to be levitated, and the work is levitated by jettisoning of air; and wherein an ionization device for ionizing the air is provided in an air supply path for the air for work levitation, so as to neutralize the static electricity on the work by the work levitation air being jettisoned.

With a preferable embodiment of the above air levitation apparatus having a neutralization device, the air levitation apparatus is an apparatus for transporting the plate-shape work while levitating the work by jettisoning air, and the work levitation face is configured of the upper wall surface of an air tank unit of the air levitation apparatus. In this case, the ionization device is preferably installed within the air tank unit.

Also, with another preferable embodiment of the above air levitation apparatus having a neutralization device, a part of the air jets or a channel leading thereto is configured of a second through hole formed by covering the inner wall of a first through hole provided on a channel wall with an insulating member; and a discharge needle of the ionization device is provided within the second through hole.

Further, the air jets may be formed of through holes provided on a wall making up the work levitation face, with a porous material provided at the upper portion within the through holes so as to close off the through holes, wherein discharge needles of the ionization device are provided at the air intake side of the porous material or within the porous material.

On the other hand, with a neutralization method for an air levitation apparatus according to the present invention for solving the above problems, a plate-shaped work is levitated by jettisoning of air from a work levitation face; wherein static electricity generated at the work due to the work levitation air is neutralized by flowing ionized work levitation air between the plate-shaped work and the work levitation face.

With the above neutralization method, the work levitation air is preferably ionized by an ionization device provided in an air supply channel, and then jettisoned from a plurality of air jets provided on the work levitation face so as to flow between the plate-shaped work and work levitation face.

According to the present invention described above in detail, at the time of removing static electricity generated at a work due to work levitation air, the neutralization device installation space above and below the work transporting path can be reduced, and the entire work can be neutralized without irregularities by flowing ionized air between the plate-shaped work and the work levitation face.

DESCRIPTION OF THE PREFERRED EMBODIMENTS

Figure 1:
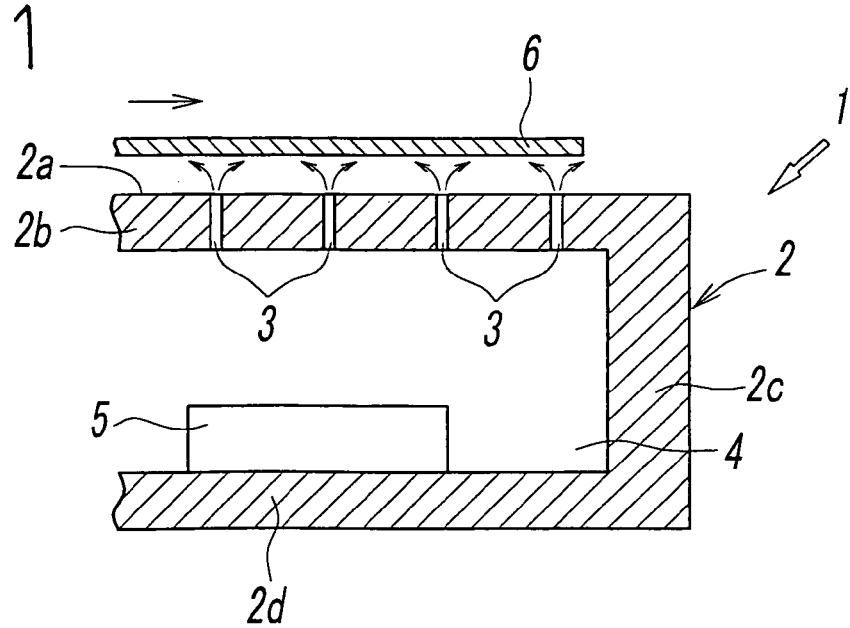
FIG. 1 is a conceptual diagram illustrating an embodiment of the air levitation apparatus with neutralization device according to the present invention.

FIG. 1 illustrates an embodiment of an air levitation apparatus with a neutralization device according to the present invention.

This air levitation apparatus 1 is an apparatus which has multiple air jets 3 on a work levitation face 2a for levitation of a plate-shaped work 6, for transporting the plate-shaped work 6 while levitating by jettisoning air from the jets 3, with the work levitation face 2a being formed above an upper wall 2b of an air tank unit 2 of the air levitation apparatus 1.

Note that the air levitation apparatus according to the present invention is not restricted to transporting the plate-shaped work 6 while levitating, and the present invention can also be applied to an apparatus which performs simple air levitation and holding of the work.

The air tank unit 2 has an elongated rectangular parallelepiped shape extending in the transportation direction of the plate-shaped work 6, having a low space portion 4 defined by an upper wall 2b, side wall 2c, and floor wall 2d, with the multiple air jets 3 being provided through the upper wall 2b.

The air tank unit 2 is connected to an air supply source (not shown) via piping, so that an air supply channel is configured of the piping and space portion 4, from the air supply source to the air jets 3, with an ionization device 5 for ionization of the work levitation air being installed in the space 4 to which the work levitation air is supplied from the air supply source.

The ionization device 5 is the same as an ion generator for obtaining ionized neutralization air with a conventional neutralization device, and while not shown in the drawings, the device has discharge electrodes connected to a power feed circuit, and generates ions by corona discharge.

With the above air levitation apparatus 1 with the neutralization device, static electricity is generated at the plate-shaped work 6 due to the friction from the air jettisoned from the multiple jets 3 provided on the work levitation face 2a flowing between the plate-shaped work 6 and the work levitation face 2a, but ions in the jettisoned air which are of opposite polarity to the polarity of the electrostatic charge at the plate-shaped work 6 come into contact with the surface of the plate-shaped work 6, thereby electrically neutralizing the electrostatic charge of the work.

In this case, the air levitation apparatus 1 with the neutralization device jettisons ionized air for levitation of the plate-shaped work 6 from the multiple jets 3 provided on the work levitation face 2a, so the ionized air can be made to flow between the plate-shaped work 6 and the levitation face 2a, thereby neutralizing the plate-shaped work 6 without irregularities due to the positive or negative ions in the jettisoned air.

Figure 5:
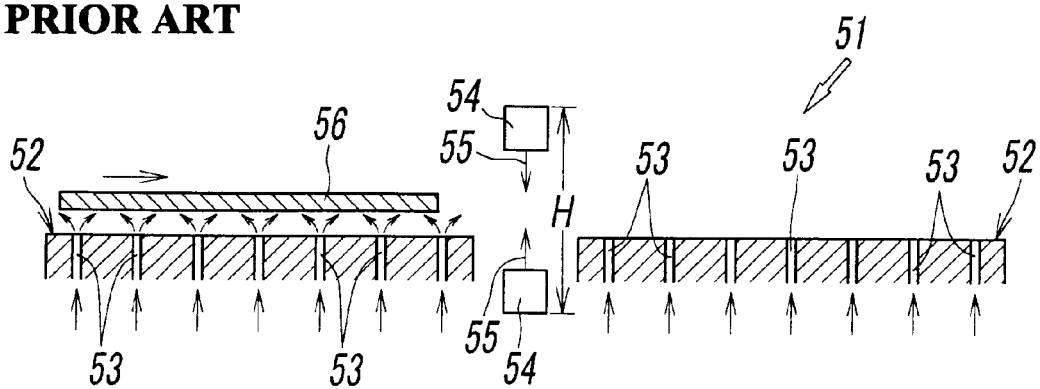
FIG. 5 is a conceptual diagram illustrating a conventional air levitation apparatus with neutralization device.

Also, the air levitation apparatus 1 with the neutralization device performs neutralization by flowing ionized work levitation air jettisoned from the work levitation face 2a between the plate-shaped work 6 and the work levitation face 2a, so as shown in the conventional air levitation apparatus 51 with the neutralization device shown in FIG. 5, there is no need to install neutralization devices 54 for neutralization of the static electricity above and below the work 56 along the transportation path of the work 56, and accordingly, the space for installing the neutralization devices can be reduced.

Figure 2:
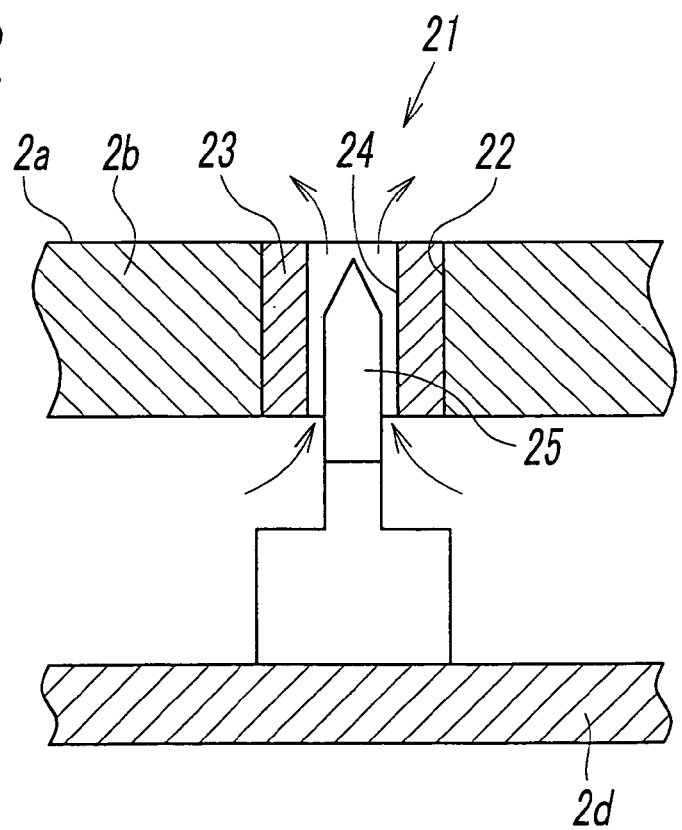
FIG. 2 is a conceptual diagram illustrating another embodiment of the neutralization device.
Figure 3:
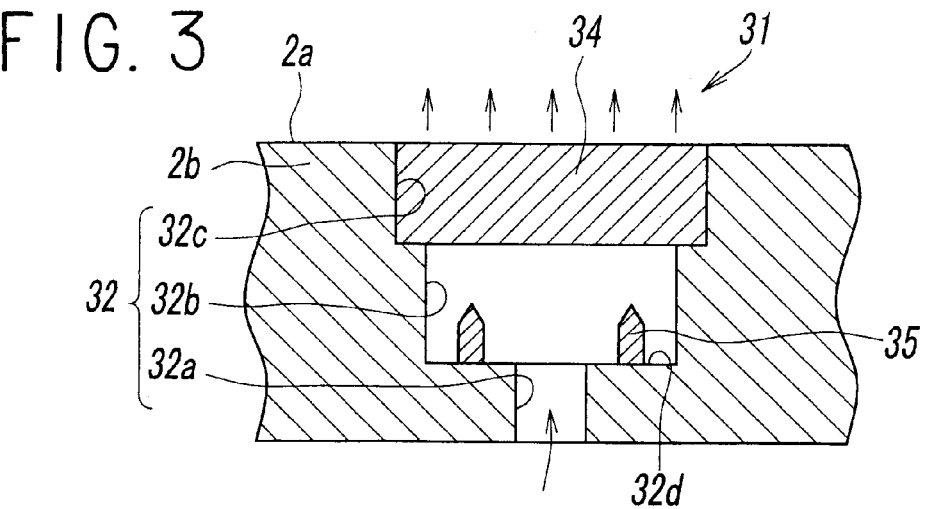
FIG. 3 is a conceptual diagram illustrating yet another embodiment of the neutralization device.
Figure 4:
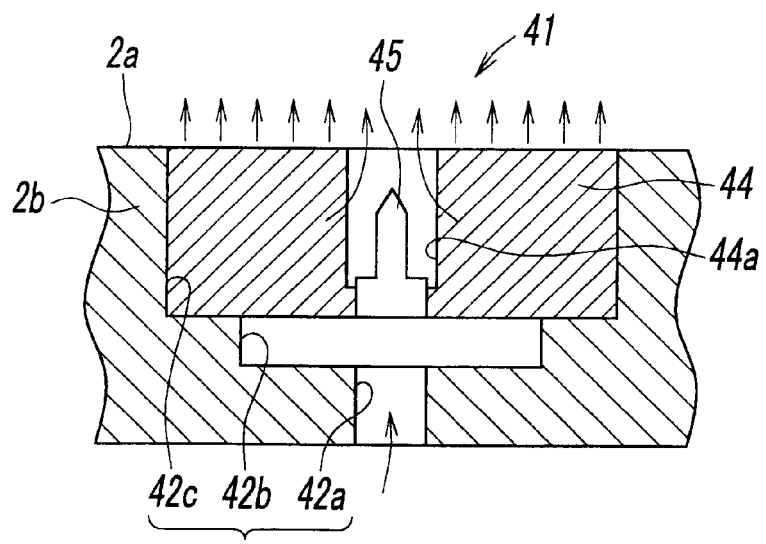
FIG. 4 is a conceptual diagram illustrating yet another embodiment of the neutralization device.

FIG. 2 through FIG. 4 are conceptual diagrams for describing other embodiments of the levitation apparatus with the neutralization device according to the present invention.

The embodiments shown in FIG. 2 through FIG. 4 will be described regarding the air jets provided on the work levitation face 2a for levitation of the plate-shape work 6, but can also be used as the ionization device for supplying the ionized air to the space 4 within the air tank unit 2 shown in FIG. 1. In any case, there is no difference in that an ionization device for ionizing the air is installed in the air supply path for the work levitation air of an apparatus which transports work by levitation by jettisoning air, and also, these embodiments are basically in common with the embodiment shown in FIG. 1 with regard to this point. Accordingly, specific structures of the air jets and ionization device which differ from the embodiment shown in FIG. 1 will be described, and description of other structures will be omitted.

With the embodiment shown in FIG. 2, multiple air jets 21 are formed of second through holes 24 formed by covering the inner wall of first through holes 22 provided in the wall 2b making up the work levitation face 2a with an insulating material 23, and discharge needles 25 of the ionization device are provided within the second through holes 24. Accordingly, ionized work levitation air flows through the gap between the second through hole 24 and the discharge needle 25 so as to flow between the plate-shaped work 6 and the work levitation face 2a, so that the plate-shaped work 6 is neutralized without irregularity by the positive or negative ions within the jettisoned air.

With the embodiment shown in FIG. 3, an air jet 31 is configured of a through hole 32 provided to the wall 2b making up the work levitation face 2a, and a porous material 34 provided at the upper portion of the through hole 32 which is the air outflow side, so as to close off the through hole 32, and multiple discharge needles 35 of the ionization device are provided at a portion lower than the porous material 34 which is the air intake side of the through hole 32.

The through hole 32 can be formed as the through hole 32 with steps so as to increase in diameter in steps, with the diameters 32a, 32b, and 32c, in order from the air intake side toward the air outflow side, with the porous material 43 being provided so as to close off the diameter 32c portion positioned toward the top, with multiple discharge needles 35 of the ionization device being provided at a step portion 32d lower than the porous material 34.

The work levitation air ionized by the multiple discharge needles 35 blows upwards through the many holes of the porous material 34 provided so as to close off the upper portion of the through hole 32, flows between the plate-shaped work 6 and the work levitation face 2a, and the plate-shaped work 6 is neutralized without irregularity by the positive or negative ions within the jettisoned air.

Also, with the embodiment shown in FIG. 4, an air jet 41 is configured of a through hole 42 provided to the wall 2b making up the work levitation face 2a, and a porous material 44 having a through hole 44a near the center portion thereof, the porous material 44 being provided at the upper portion of the through hole 42 which is the air outflow side, so as to close off the through hole 42, with a discharge needle 45 of the ionization device being provided within the through hole 44a of the porous material 44.

The through hole 42 can be formed as the through hole 42 with steps so as to increase in diameter in steps, with the diameters 42a, 42b, and 42c, in order from the air intake side toward the air outflow side, with the porous material 44 being provided so as to close off the diameter 42c portion positioned toward the top.

The work levitation air ionized by the multiple discharge needle 45 blows upwards between the through hole 44a of the porous material 44 and the discharge needle 45, and along with the work levitation air blowing upwards through the many holes of the porous material 44 provided so as to close off the upper portion of the through hole 42, flows between the plate-shaped work 6 and the work levitation face 2a, and the plate-shaped work 6 is neutralized without irregularity by the positive or negative ions within the jettisoned air.

The neutralization method with the above-described air levitation apparatus is clearly understood from the operations of the air levitation apparatus 1 with the neutralization device described with the embodiment shown in FIG. 1, so description thereof will be omitted.

While the air levitation apparatus with the neutralization device and the neutralization method with a air levitation apparatus according to the present invention has been described in detail, the present invention is in no way restricted to the above embodiments, and various modifications can be made in design without departing from the spirit and scope of the invention in the claims.

For example, while the embodiment shown in FIG. 1 has the ionization device 5 for ionization of the work levitation air installed within the space 4 of the air tank unit 2, the present invention is not necessarily restricted to this embodiment, and an arrangement may be made wherein the ionization device 5 is provided along the piping connecting the air supply source and the air tank unit 2.

Also, while the embodiment shown in FIG. 1 uses the upper wall face of the air tank 2 as the work levitation face 2a, the work levitation face 2a does no need to be restricted to the upper wall face of the air tank 2.

Further, in the event that there is need for neutralization pf the upper face of the plate-shaped work 6 as well, ionized air can be brought into contact with the upper face of the plate-shaped work 6 within a range that does not obstruct the levitation of the plate shaped work by air jettisoning with the work levitation apparatus.

The invention claimed is:

1. An air levitation apparatus, comprising:
an air tank;
an ionization device within the air tank,
wherein a plurality of air jets are provided on a work levitation face side of the air tank upon which a plate-shaped work is to be levitated, and the work is levitated by jettisoning of air from the air jets,
wherein the work levitation face side includes an upper wall surface of the air tank connected to an air supply source, and the plurality of air jets connecting a space in an interior of the air tank, and
wherein the ionization device includes discharge needles which generate ions by corona discharge, and by jettisoning ionized air including ions generating by the ionization device from the plurality of air jets, the device is configured so as to perform the work levitation and the work neutralization by ionized air.

2. The air levitation apparatus according to claim 1, wherein the ionized air including ions generated by the ionization device is jettisoned from the plurality of air jets after the ionized air is supplied to the space of the air tank.

3. The air levitation apparatus according to claim 1, wherein a discharge needle of the ionization device is positioned in one or more of the air jets.

4. The air levitation apparatus according to claim 3, wherein an inner wall of one or more of the air jets is covered by an insulating member, and the discharge needles are provided in a through hole surrounded by the insulating member.

5. The air levitation apparatus according to claim 3, wherein a porous material is mounted so as to at least one of surround and cover the discharge needles in an opening of the air jet in which the discharge needles is provided.

* * * * *